Oct. 31, 1950        R. R. CAHEN        2,527,913
PHOTOELECTRIC DEVICE
Filed Aug. 4, 1948                              3 Sheets-Sheet 1
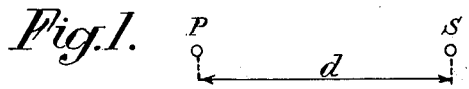
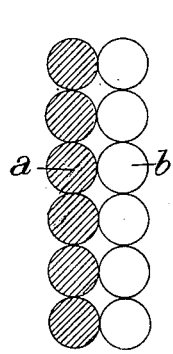 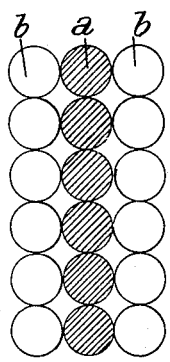 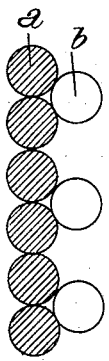 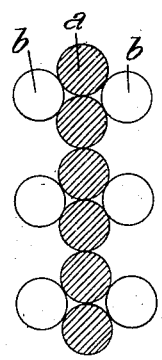
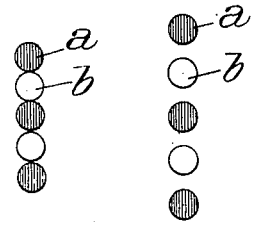 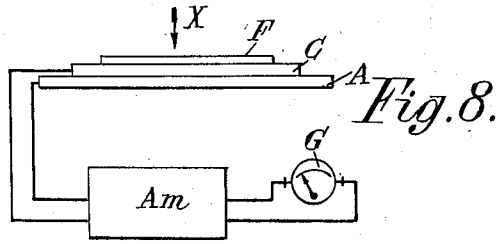
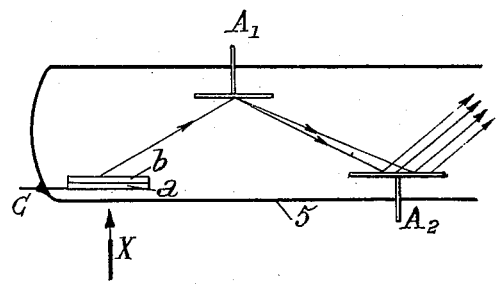
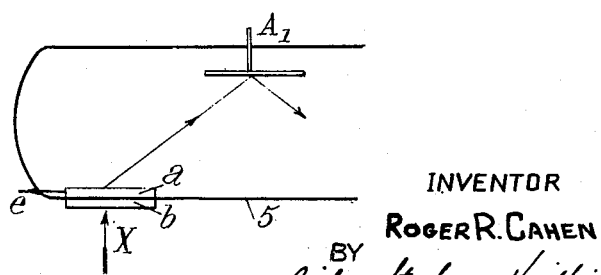
INVENTOR
ROGER R. CAHEN
BY
Bailey, Stephens & Huettig
ATTORNEYS

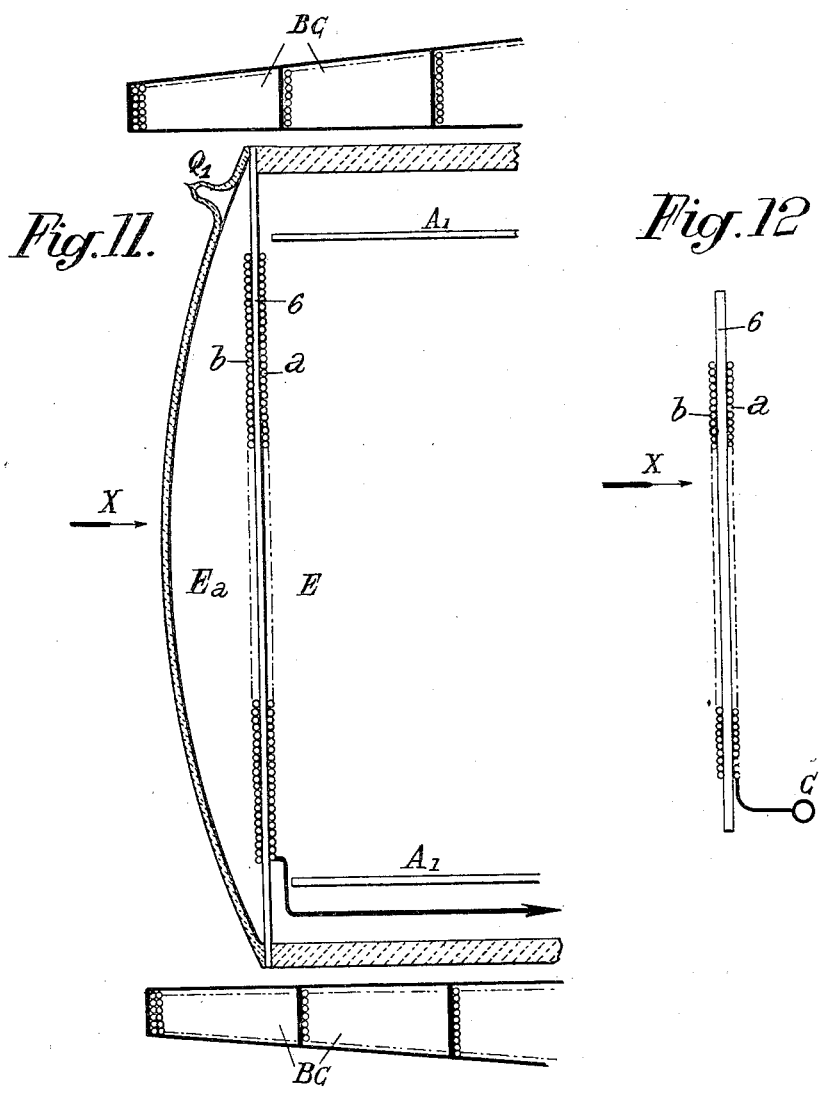

Patented Oct. 31, 1950

2,527,913

UNITED STATES PATENT OFFICE 2,527,913

PHOTOELECTRIC DEVICE

Roger R. Cahen, Paris, France, assignor to "La Radio Industrie S. A.," Paris, France, a society of the Republic of France Application August 4, 1948, Serial No. 42,531
In France August 6, 1947

5 Claims. (Cl. 250—71)

The invention relates to systems of the photoelectric kind, that is to say intended to release electrons (or possibly to stop their emission), under the effect of radiations working inside given ranges and whether or not they belong to the visible spectrum.

It has chiefly for its object to make these systems such that they have a higher sensitivity and that their field of application can be considerably increased, concerning the ranges of frequency or of wave length of the incident radiations.

Preferred embodiments of my invention will be hereinafter described with reference to the accompanying drawings, given merely by way of example and in which:

Figs. 1 to 7 of these drawings are diagrams intended to illustrate the principle of the invention;

Figs. 8 to 11 diagrammatically show the essential elements of a photoelectric analyzer in particular for reproduction of an image obtained from X rays, this analyzer being made according to various embodiments of the invention;

Fig. 12 diagrammatically illustrates in sectional view a photo-emissive cathode included in an apparatus of this kind and made according to another embodiment of the invention;

Fig. 13 shows in a more detailed manner an analyzer made according to one of the embodiments of my invention;

Finally, Fig. 14 diagrammatically shows, in section, the screen of an analyzer, according to another embodiment of the invention.

It should be reminded that there exists at the present time photoelectric devices (in particular those included in television analyzers) which have the property of emitting electrons under the action of some incident radiations which, as a matter of fact, are localized in certain ranges of frequency.

When the incident radiations are outside of said ranges, it is necessary to provide for a change of frequency and to have recourse, for instance, to luminescent substances (fluorescent or phosphorescent) adapted, on the one hand, to be excited by the incident radiations, and, on the other hand, themselves to produce radiations inside said ranges.

Such a transformation is obtained if, for instance, having received on a fluorescent screen an image obtained through X rays, this image is transmitted, for examination purposes, either on the spot or at a distance to an analyzer belonging to a television system, provided that the fluorescence thus brought into play is suitably adapted to the range of sensitivity of the cells of the analyzer.

In a combination of this kind, a photosensitive element P belonging to the analyzer (Fig. 1) will give a voltage, or will be the seat of an electric current when it receives the light flux from an element of fluorescent or phosphorescent substance S located at a distance $d$, for instance made fluorescent or phosphorescent through the action of X rays.

The voltage or the current produced by an element P of this kind varies in the same manner as its illumination, itself inversely proportional to the square of distance $d$.

It has been imagined to bring source S and element P close to each other by juxtaposing them or incorporating them to each other, thus producing highly sensitive photoelectric devices with a change of frequency of the incident radiations, which devices will be hereinafter called luminescent photoelectric cathodes, this merely for the sake of clarity of explanations and without there being any limitative character involved in this expression.

By proceeding in this way, sensitivity to incident radiations is brought to a maximum, owing, on the one hand, to the fact that S and P are close to each other, and, on the other hand, to the possibility of dispensing with any optical system for transmitting the image to the photosensitive body (which would be the case if a fluorescent screen were projected onto an analyzer, as above mentioned), which is tantamount to increasing infinitely the aperture of said optical system.

The present invention includes new applications based upon the possibility of making photosensitive systems, and in particular those of television analyzers, sensitive to new ranges of radiations (such as X rays for instance) through very simple modifications of structure, as it will be hereinafter described.

While the existing photoelectric cells are sensitive only to radiations ranging from $\lambda$ to $\lambda'$, it is possible, owing to the adjunction of the above mentioned substances, in particular luminescent ones (it being understood that the invention provides for the adjunction of any substance, even other than luminescent ones, which acts as a frequency changer under the action of the incident radiations) to make said cells sensitive to any other electromagnetic radiations, for instance: gamma radiations of radium; X rays; ultra-violet rays; visible radiations; red and infra-red radiations, it being understood that, in particular in this case, I may have recourse to the Becquerel effect, by producing a continuous luminescence or phosphorescence through the action of auxiliary rays or through any other means, so that the incident infra-red rays produce, this time, no longer emission of luminescent radiations, but extinguishing thereof; or a combination of several ranges of radiations, it being understood for instance that the photoelectric cell or the analyzer treated according to the invention can simultaneously receive, on the one hand, the rays of the visible spectrum that are directly transmitted thereto, and, on the other hand, luminescent rays belonging also to this spectrum (or anyway to that capable of acting on the photoelectric elements) and obtained by frequency transformation from radiations which do not belong to this spectrum.

It will therefore be necessary to choose, in each particular case, the luminescent substance or substances suitable for the obtainment of the desired result, and this by relying on the data available in this technical field.

Said substances may be merely fluorescent if it is desirable to obtain instantaneous effects, while they may be phosphorescent, that is to say of prolonged luminescence, when remanence of the phenomenon is not detrimental or on the contrary proves necessary, for instance for the purpose of integrating radiation pulsation while supplying a continuous mean resultant, or for ensuring persistence of a phenomenon with a time constant depending upon the chosen substance.

Besides, these substances should be chosen in such manner that the radiations they produce when they are excited by the incident radiations are, as far as possible, inside the zone of optimum sensitivity of the photoelectric cells known at the present time. This zone is often located near the lowest wave-lengths, that is to say in the blue or green range. Now, there are many known substances which emit respectively in the red range (calcium borate for instance) in the green range (willemite $Zn_2SiO=MnSiO_4$), in the blue range (magnesium or calcium tungstate). There are also zinc sulfides which give rise to a prolonged luminescence, either mixed or not with various phosphorogeneous bodies (silver or copper), which have for their effect eventually to transform fluorescence into phosphorescence. It is therefore possible, through a suitable choice of these substances, to comply with the above stated conditions.

Concerning now the way of adapting said substances to the luminescent cathodes or electrodes to be obtained, different possibilities exist, in particular according to the type of photoelectric cell that is chosen, it being understood that said cells may be, among others: either photoconducting cells, that is to say of the resistance variation type; or photovoltaic cells, that is to say of the stop layer type; or again emissive cells, of the vacuum or gas-filled type.

In a general manner, it seems that the luminescent substances can be disposed on the same support as the photoelectric particles, either on the same side or on the other side, eventually in separate chambers which may be filled with different gases. But one might also provide distinct supports.

I will now describe a plurality of embodiments which may be chosen, in particular, according to the desired purpose and the technical conditions to be complied with. Conventionally, the shaded circles $a$ of Figs. 3 to 5 represent photosensitive particles and the white circles $b$ luminescent particles which may be of different dimensions and thicknesses.

In the arrangement of Fig. 2, the luminescent particles $b$ are distributed over one of the faces of the photosensitive layer and receive the incident electromagnetic radiations. This arrangement is more particularly applicable to the case of photoconducting cells and photovoltaic cells.

According to the embodiment of Fig. 3, substances $b$ are distributed on both faces. The cell may be attacked either on one or the other of said faces, or, in particular in the case of penetrating electromagnetic radiations, on only one of them, the second face having a part to play owing to the penetration of said radiations. Such an arrangement is more especially applicable to the case of photo-conducting cells the whole outer surface of which is active.

According to the embodiment of Fig. 4, the electromagnetic radiations can directly attack the photosensitive layer owing to the fact that particles $b$ do not touch each other. I proceed in this way, in particular, when it is desired to obtain a direct action of said radiations simultaneously with the luminescence effect and, also, in the case of cells including an anode and a cathode, in particular of the vacuum or gas filled emissive cells including a photo-cathode, the electrons released by such cells subsequently finding their way toward the anode through the intervals between particles $b$.

Fig. 5 shows an arrangement of the same kind with luminescent particles at a distance from one another located on either side of particles $a$.

Figs. 6 and 7 show arrangements corresponding to cathodes of the semi-transparent type or to those which constitute photo-sensitive mosaics making use of particles electrically insulated from one another, so as to avoid equalization over the surface of the electric charges they contain.

Figure 13:
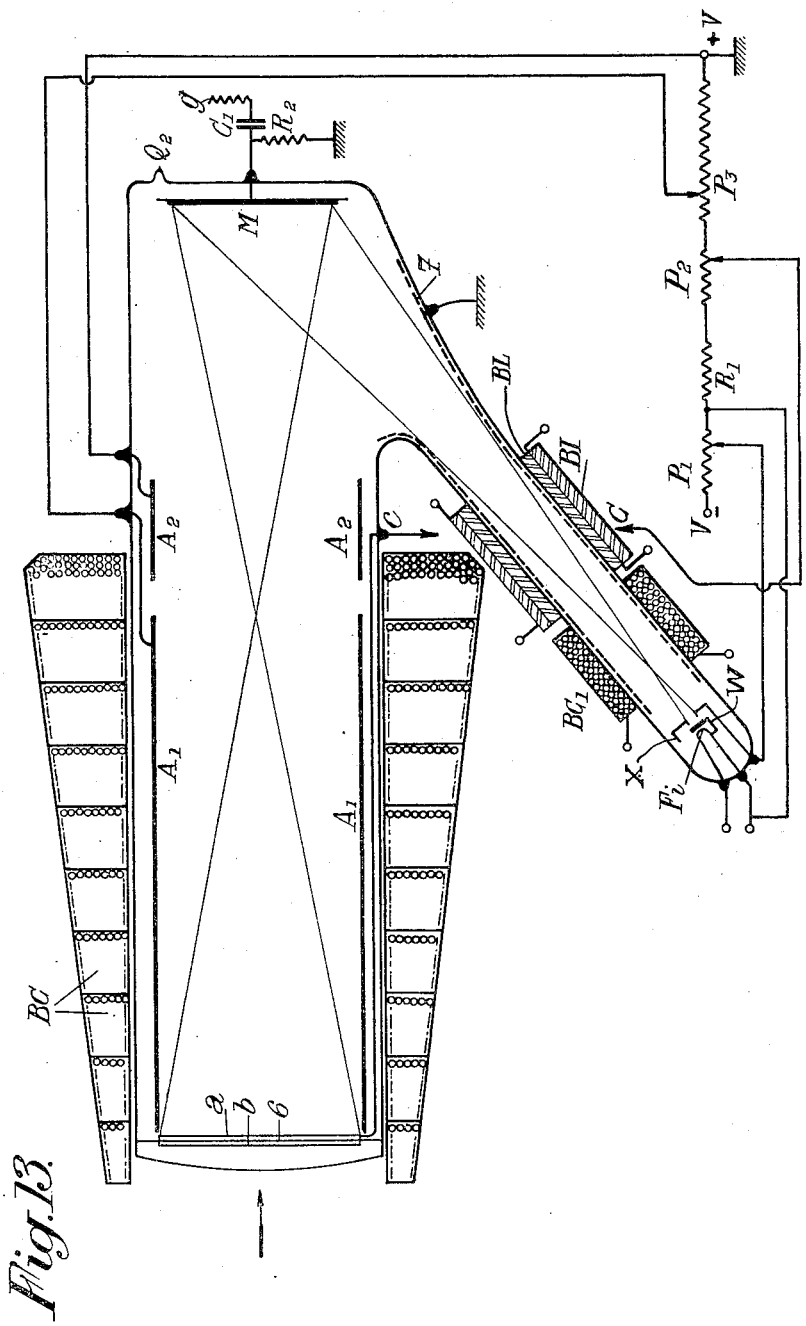

It should be noted that, in all these arrangements, I may use variable thicknesses of the photosensitive layers and of the luminescent substances, down to the minimum thickness of molecular character, with or without distinct support of the cathode proper, this according to the rigidity thereof. Of course the support may be of such a nature that it does not absorb the incident electromagnetic radiation if, for technical reasons, this radiation is to be transmitted through said support and does not oppose transit of the electrons when they are to leave the photosensitive layer toward an external anode.

Whatever be the embodiment adopted for these photoelectric effect luminescent cathodes, it will be understood that they can be applied in the most various ways in all apparatus where such an effect is desired, it being understood that they can, in particular:

Either constitute by themselves the photoelectric device from which the electrons are directly collected for any applications, as this would be the case for instance if, as illustrated by Fig. 14, the usual mosaic of television apparatus of the iconoscope type were replaced by a luminescent cathode of the type according to the present invention, with a support of mica or another matter at 1, a cesium-silver or other photosensitive layer at 2, an electrode for catching the electrodes at 3 (metallizing) and a layer 4 of a luminescent substance (Fig. 14);

Or constitute, as it will be hereinafter described, intermediate cathodes (case of emissive cathodes) which emit electrons intended, eventually after amplification by means of tubes or preferably by means of electron multiplying devices or in any other way, to influence another electrode, in particular a secondary emission anode, of an analyzer or other device.

It should be well understood that the invention also extends to the case where the luminescent cathode is replaced by a device serving only to transform radiations (therefore which does not emit electrons), but located however close to the photoelectric cell proper.

Fig. 8 diagrammatically shows an apparatus adapted to be used for detection or measurement of X rays in radiology, when the operator is not equipped with a sensitive apparatus enabling him to check up the intensity of the rays he is using.

The cell sensitive to X rays is constituted by at least one iron-selenium or copper-copper oxide photosensitive element of the stop layer type. Its active face C is covered with a luminescent substance, for instance, a fluorescent one F constituted by zinc sulfides, according to one of the features of the invention.

Measurement takes place by means of an apparatus such as a movable frame galvanometer G inserted between cathode C and anode A, or, after amplification, by means of a direct current amplifier $Am$ of conventional type. Values are marked on the scale by comparison with the indications of an ionization chamber with electroscopic reading.

Fig. 9 illustrates the case in which emissive cells are used with release of electrons leaving the luminescent cathode, in combination with electronic multipliers, which are particularly suitable in this case, in view of the important value of the gain, the low value of the background noise and the relative simplicity.

The luminescent cathode is shown at C with its two layers $a$ and $b$ of the kind of those shown by Figs. 2 to 7. Secondary emission anodes $A_1$, $A_2$, etc., act upon the electronic flux and perform the desired multiplication.

The arrangement of Fig. 4 should be adopted in the case of incident X (or other) rays which are not absorbed by layer $a$; they excite luminescence of layer $b$ the discontinuities of which enable the electronic flux to travel toward anode $A_1$.

Fig. 10 illustrates an arrangement utilized when the luminescent layer may soil the tube by its emanations, which might be the case when sulfides are used. Said layer is disposed on the outside of tube 5 and protected by a varnish, whereas the photosensitive layer has in this case a semi-transparent monomolecular structure.

Fig. 11 illustrates another feature of the invention according to which, in order to reproduce radiographic images in surgery or in any other technical fields, the image is made to appear upon a television or similar receiver, in such manner as to eliminate the difficulty constituted for the operator by the presence of a radioscopic screen above the field of operation (in particular, in surgery, for extracting projectiles, reducing broken bones under the screen, and so on).

Owing to this arrangement, the image can be observed at any desired place, since it suffices to place the television receiver at this place. Furthermore, assistants or students can follow in any number the phases of the operation.

For this purpose, I provide for instance an apparatus of the kind of that shown by Figs. 11 to 13, including an analyzer tube fitted with a luminescent photoelectric cathode, with, for instance, the photosensitive particles $a$ and the luminescent particles $b$ disposed on either side of a transparent plate 6.

The impact of X rays on particles $b$ produces luminescence and excites particles $a$, producing an electronic image focalized by an electronic optical system constituted by concentration coils such as BC and anodes $A_1$, $A_2$. The electronic image then strikes a secondary emission mosaic M, then charging its elements which are subsequently discharged by the scanning of an electron gun of the usual type shown at the bottom of Fig. 13.

Fig. 13 shows filament $Fi$, Wehnelt electrode W, focusing ring X, concentration coils $BC_1$, line and frame scanning coils BL and BI and the feed potentiometer composed of resistances $P_1$, $P_2$, $P_3$, $R_1$. This potentiometer also supplies the voltages impressed upon cathode C $(a, b)$, anodes $A_1$, $A_2$ and Wehnelt electrode W. The inner surface of the gun and its end portion are metallized, along the dotted lines of the drawing at 7, and earthed, or held at a suitable potential. The video-frequency voltage, collected at the ends of load resistance $R_2$, acts upon the grid $g$ of a first amplifier tube, through condenser $C_1$.

Mosaic M may be constituted by small spheres of cesium-silver matter and the whole of the luminescent cathodes therefore makes use of known means.

In the system shown, this luminescent cathode is supposed to be supported by a thin glass plate 6, so as to reduce to a minimum the diffusion of the luminous radiation from the luminescent substance that may result from the thickness of said glass plate, which diffusion would be detrimental of a good definition of the image obtained (Fig. 12). This thin glass plate 6 may be of plane shape but it may be advantageous to give it a curved shape to permit electronic corrections.

The arrangement of the luminescent particles $b$ (for instance zinc sulfide) and of the photosensitive particles $a$ (for instance cesium-antimony) may be analogous to that of Fig. 2, these particles being separated by the thin glass plate.

These two chemical substances have a maximum of spectral selectivity in the blue region, near 4,500 angstroms, in such manner as to give rise to a maximum of efficiency; it should be noted that in order to avoid soiling of the vessel E of the analyzer by zinc sulfide, the luminescent layer is placed in an auxiliary vessel $E_a$ (Fig. 1).

At $Q_1$, $Q_2$ (Fig. 13) a vacuum can be produced simultaneously in both vessels, which permits of providing a very thin glass plate 6, the same vacuum existing simultaneously on both of its sides.

The complications of manufacture resulting from the presence of an auxiliary vessel may besides be avoided by providing a vitrified luminescent substance to constitute plate 6 or by enclosing this substance between two glass plates welded along their periphery.

The area of the luminescent cathode may be of the order of magnitude of a small radioscopic screen whereas that of the analyzed mosaic can be smaller owing to the electronic optical means.

In the constructions of the preceding examples, it has been supposed that the invention is applied in the case of X rays, which constitutes an interesting application since as a rule photoelectric cells are not responsive to such rays, which, despite their high energy quantum, release but a negligible number of electrons.

But, in fact, the luminescent cathodes according to the invention can be applied, as already above stated, to all electromagnetic radiations capable of exciting fluorescence or phosphorescence, or again of producing their excitation through a suitable choice of the components of said cathodes.

Thus the television electronic analyzer of Figs. 11 to 13 might give an image in the infra-red region throgh a phosphorography effect. In this case, fluorescence of substance b should be excited by means of an auxiliary source such as Wood's light or by incorporating in the substance radio-active salts ensuring a permanent self-phosphorescence. An infra-red image projected by means of a suitable optical system would then produce an attenuation of luminescence, which would find its electrical translation under the form of a variation of voltage at the ends of output resistance $R_2$.

If the invention were applied with iconoscopes with direct scanning of the photosensitive mosaic by means of electromagnetic radiations (Fig. 14), the layer 4 of luminescent substances, which might for instance be constituted chiefly by platino-cyanide of barium or by zinc sulfide, would advantageously be localized between the mica wall and the metal coating, so as to avoid soiling of the tube vessel. This arrangement would besides ensure an excellent efficiency due to the fact that mica is translucid to fluorescent radiations.

The present invention has, among others, the following advantages:

Possibility of adapting photoelectric cells to new radiations excluded, up to now, from their field of application;

Possibility, by choosing the luminescent substances, of adapting them to the curve of sensitivity of the photoelectric particles;

And possibility, in particular concerning X rays, of obtaining measurements or of reading images through means much more practical than those used up to the present time and which do not in any way interfere with the work of the operator.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a television system for transmitting images formed by electro-magnetic radiations outside of the visible range of the spectrum, an electron camera tube including a mosaic at the rear part of said tube, a light transparent partition at the front part of said tube arranged to receive said images, said partition being so thin as to be unable to withstand without breaking the effect of appreciably different pressures acting on its respective faces, the two spaces formed inside said tube on opposite faces of said partition being exactly at the same vacuum, a layer of electron emitting photo-sensitive elements on the face of said partition turned toward said mosaic and a layer of a luminescent substance sensitive to said radiations on the other face of said partition and electronic optical means for transmitting to said mosaic the electronic image formed on the first mentioned face of said partition in response to the action of the incident radiations on the second mentioned face thereof.

2. In a television system for transmitting images formed by X rays, an electron camera tube including a mosaic at the rear part of said tube, a light transparent partition at the front part of said tube arranged to receive said images, said partition being so thin as to be unable to withstand without breaking the effect of appreciably different pressures acting on its respective faces, the two spaces formed inside said tube on opposite faces of said partition being exactly at the same vacuum, a layer of electron emitting photo-sensitive particles on the face of said partition turned toward said mosaic and a layer of a luminescent substance sensitive to X rays on the other face of said partition, and electronic optical means for transmitting to said mosaic the electronic image formed on the first mentioned face of said partition in response to the action of the incident X rays on the second mentioned face thereof.

3. An electron camera tube according to claim 1 in which said partition is of curved shape.

4. An electron camera tube according to claim 2 in which said partition is of curved shape.

5. An electron camera tube according to claim 2 in which said electron emitting photo-sensitive particles consist of cesium-antimony and said luminescent substance consists of zinc sulfide.

ROGER R. CAHEN.

REFERENCES CITED

The following references are of record in the file of this patent:

UNITED STATES PATENTS

| Number | Name | Date |
| --- | --- | --- |
| 2,177,360 | Busse | Oct. 24, 1939 |
| 2,189,988 | Lester | Feb. 13, 1940 |
| 2,198,479 | Langmuir | Apr. 23, 1940 |
| 2,219,113 | Ploke | Oct. 22, 1940 |
| 2,270,373 | Kallmann et al. | Jan. 20, 1942 |
| 2,344,042 | Kallmann et al. | Mar. 14, 1944 |

OTHER REFERENCES

Ser. No. 331,054, Gorlich (A. P. C.), filed Apr. 22, 1940, published May 25, 1943.